(12) United States Patent
Batthish et al.

(10) Patent No.: US 8,677,325 B2
(45) Date of Patent: Mar. 18, 2014

(54) APPLICATION SERVICES SOURCE REFACTORING

(75) Inventors: Ibrahim Batthish, Markham (CA); Satish Gungabeesoon, Markham (CA); Donald J. Yantzi, Markham (CA)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 13/169,610

(22) Filed: Jun. 27, 2011

(65) Prior Publication Data
US 2012/0089965 A1 Apr. 12, 2012

(30) Foreign Application Priority Data
Oct. 6, 2010 (CA) .................................... 2716770

(51) Int. Cl.
*G06F 9/44* (2006.01)

(52) U.S. Cl.
USPC ............................ 717/127; 717/124; 717/131

(58) Field of Classification Search
None
See application file for complete search history.

(56) References Cited

U.S. PATENT DOCUMENTS

| | | | |
|---|---|---|---|
| 6,389,588 B1 | 5/2002 | Wadhwa et al. | |
| 6,405,364 B1 | 6/2002 | Bowman-Amuah | |
| 6,847,981 B2 | 1/2005 | Song et al. | |
| 6,931,623 B2 | 8/2005 | Vermeire et al. | |
| 2002/0078046 A1 | 6/2002 | Uluakar et al. | |
| 2002/0178290 A1 | 11/2002 | Coulthard et al. | |
| 2005/0138603 A1 | 6/2005 | Cha et al. | |
| 2005/0144226 A1 | 6/2005 | Purewal | |
| 2008/0127118 A1* | 5/2008 | Kasman | 717/130 |

FOREIGN PATENT DOCUMENTS
WO 2007122639 A2 11/2007

* cited by examiner

*Primary Examiner* — Chuck Kendall
(74) *Attorney, Agent, or Firm* — Patents on Demand P.A.; Brian K. Buchheit; Scott M. Garrett

(57) ABSTRACT

An embodiment of the disclosure can compile source of an interactive application with debug options enabled. Execution activity of the interactive application can be enabled. A code path of a selected service of the interactive application can be executed in a debug environment using a user interface of the selected service to identify execution data associated with the selected service. Unresolved branch conditions in the execution data can be addressed for each code path of the selected service. A source extraction of the selected service can be performed.

20 Claims, 7 Drawing Sheets

APPLICATION SERVICES SOURCE REFACTORING

BACKGROUND

The present invention relates to refactoring applications in a data processing system.

Legacy interactive applications typically cannot be easily refactored as business service components for use in a services oriented architecture (SOA) environment. Using services oriented architecture to leverage legacy value reaps a series of benefits. For example, businesses can use legacy applications and data in new processes, thereby renewing the value of the legacy applications. The legacy applications are, however, monolithic and have business logic, user interface logic, and controller logic intermixed. Rewriting legacy systems or untangling logic manually is typically labor intensive, prone to errors, and cost-prohibitive.

BRIEF SUMMARY

An embodiment of the disclosure can compile source of an interactive application with debug options enabled. Execution activity of the interactive application can be enabled. A code path of a selected service of the interactive application can be executed in a debug environment using a user interface of the selected service to identify execution data associated with the selected service. Unresolved branch conditions in the execution data can be addressed for each code path of the selected service. A source extraction of the selected service can be performed.

An embodiment of the disclosure can execute a code path of a selected service of an interactive application in a debug mode of a debug environment using a user interface of the selected service to identify execution data associated with the selected service. The executed code path of the selected service can be dynamically mapped to source lines. Executed source lines can be recorded as the source lines are executed. A visited path and execution dependencies for the selected service can be detected. Unresolved branches in the execution data can be detected to form unresolved branches.

DETAILED DESCRIPTION

Figure 1:
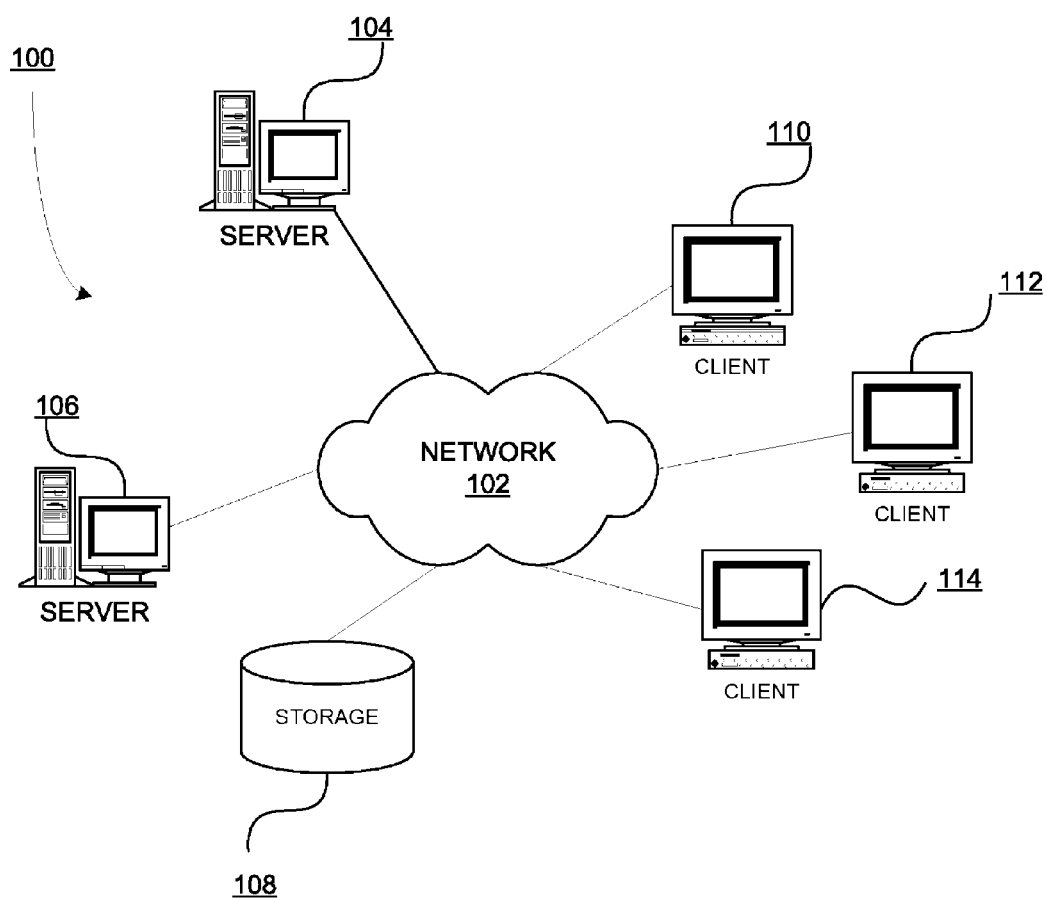
FIG. 1 is a block diagram of a network of data processing systems operable for various embodiments of the disclosure.

An interactive system refers to a system dependent on user interaction via a graphical or text based user interface for input and output throughout the systems logical flow. A non-interactive or programmatic system refers to a system that takes input and returns output only at the boundary of the system.

A stateful system refers to a computer system in which state information is persisted internally across calls to boundaries of the system, while a stateless system does not require the persistence of state information across calls to the boundaries of the system, or does so outside the boundaries of the system.

A monolithic application describes a single-tiered software application in which the user interface, controller logic, and business logic are combined into a single program executing on a single platform. In contrast a componentized application is a software application product of an architecture which is an aggregate of independent sub-applications or procedures, each possibly running on a different tier or platform, specialized to perform a unique and reusable task or set of responsibilities.

Existing tools for refactoring legacy source to produce re-usable components typically require developers to have intimate knowledge of the application code and to perform manual extraction and restructuring of the application code, based on inputs from static relationship analyses of the application. An example of such a tool is Rational® Transformation Workbench. In this scenario, the tools serve as an aid to application understanding, but still rely on the developer to apply that understanding to restructure the application by manually refactoring or extracting the analyzed code, and untangling the intermixed model, view, controller logic.

In another existing method, user interactions are simulated for a task of an application by executing prerecorded macros for the operation, passing in parameters or constant values into user interface input fields, and passing back values of output fields as return values from the operation. The method of the example requires additional work to develop and maintain the macros as the application evolves. While this method uses a black-box approach and does not require knowledge of the code, the method has a disadvantage because the underlying application remains monolithic in nature, resulting in inefficient usage of computer resources since the application now carries a large percentage of code that is loaded but never executed for the chosen end-to-end operation.

Existing refactoring tools typically provide an ability to extract sections of source code into a procedure. The solution, however, fails to remove state from the refactored code. The code in the resulting procedure continues to have a heavy dependency on the original application flow and global environment, preventing the procedure from being invoked as a standalone service. Furthermore, the tool does not help remove bindings to a user interface; therefore the extracted code remains interactive. The developer is required to manually remove dependencies on prior state and bindings to user interface logic with assistance from some provided tools.

A solution is therefore needed and provided herein to efficiently refactor large user-interactive applications into functional components of the applications. An embodiment of the solution does not require the developer to have intimate knowledge of the logical flow of the code to be able to isolate end-to-end operations from a larger interactive code base, with the resulting smaller components being, thereafter, self-contained and re-usable in a services oriented architecture environment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to the figures, FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
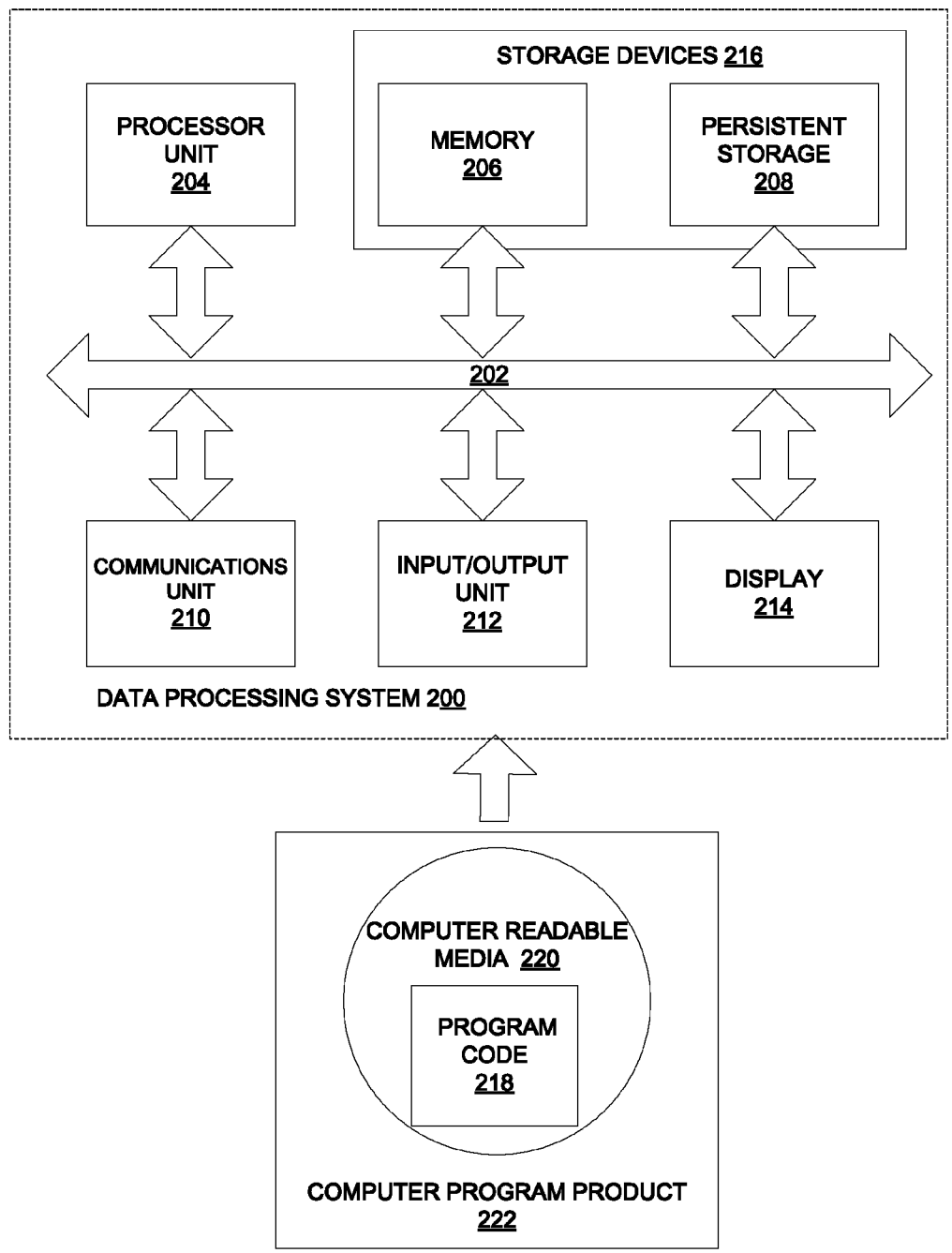
FIG. 2 is a block diagram of a data processing for various embodiments of the disclosure.

Turning now to FIG. 2 a block diagram of a data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of non-transitory, persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

According to an illustrative embodiment using data processing system 200 of FIG. 2 as an example of server 104 of network of data processing systems 100 of FIG. 1, processor unit 204 executes a computer-implemented process for refactoring an interactive application to extract a service from the interactive application. Processor unit 204 compiles source of the interactive application with debug options enabled, and enables monitoring of execution activity of the interactive application. Processor unit 204 provides a capability (may be a user, developer, programmatic scripting) to execute a code path of the selected service of the interactive application in a debug environment using a user interface of the selected service to identify execution data associated with selected service. Processor unit 204 further addresses unresolved branch conditions in the execution data for each code path of the selected service and performs a source extraction of the selected service.

In another example, a computer-implemented process, using program code 218 stored in memory 206 or as a computer program product 222, for refactoring an interactive application to extract a service from the interactive application is presented. In the alternative embodiment, program code 218 containing the computer-implemented process may be stored within computer readable media 220 as computer program product 222 or in storage devices 216.

In another illustrative embodiment, the process for refactoring an interactive application to extract a service from the interactive application may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 3:
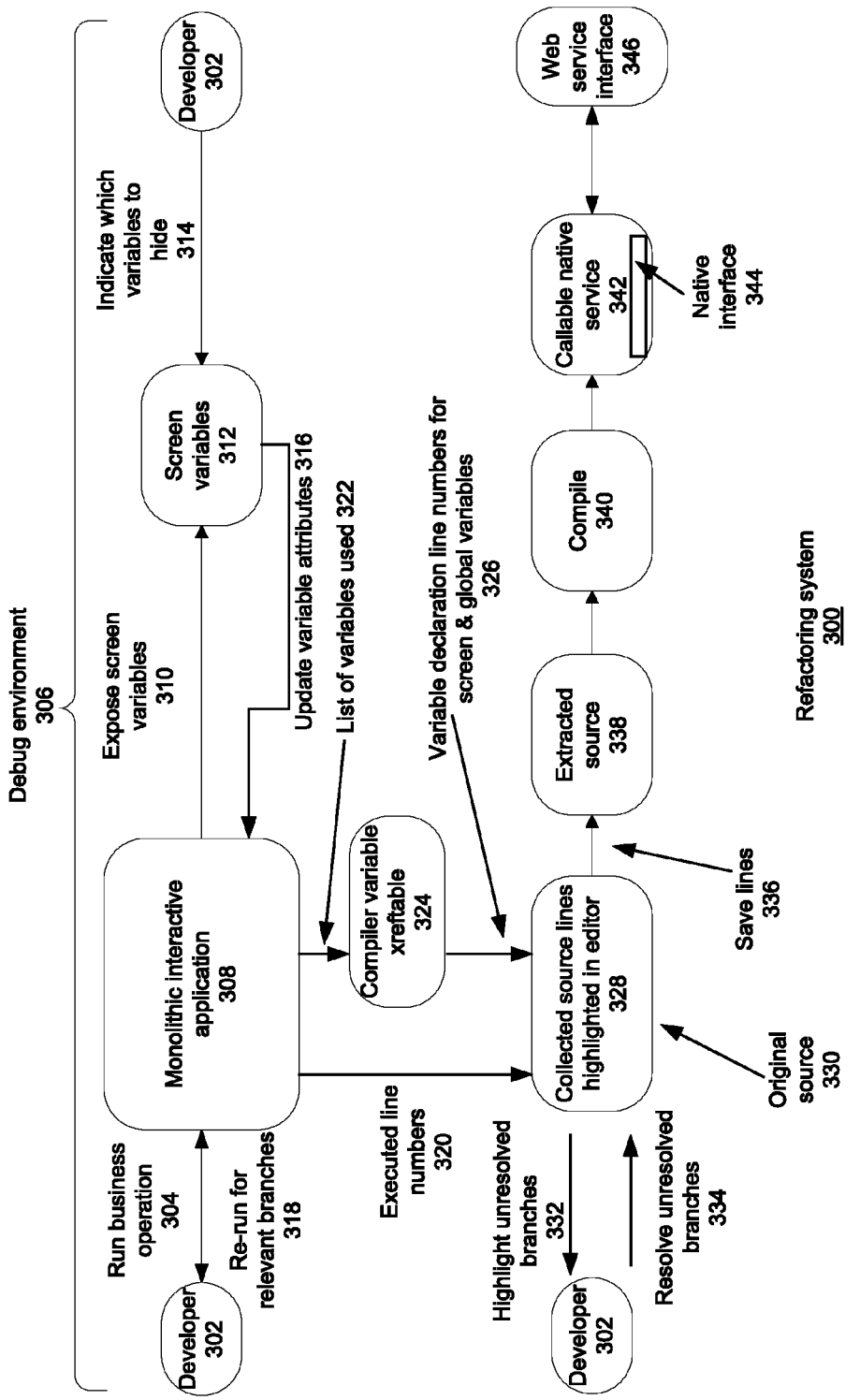
FIG. 3 is a block diagram of a refactoring system, in accordance with one embodiment of the disclosure.

With reference to FIG. 3 a block diagram of a refactoring system, in accordance with one embodiment of the disclosure is presented. Refactoring system 300 is an example of a system providing a capability of refactoring applications to extract a service from an interactive application in a software development environment of the data processing system such as data processing 200 of FIG. 2 or network of data processing systems 100 of FIG. 1.

Refactoring system 300 enables an application developer to isolate and extract relevant lines of source code that constitute the code path for an end-to-end operation imbedded in a larger user-interactive application. The latter may not have been written in a structured manner and may be in a "monolithic" form whereby the user-interface logic, controller logic, and business logic flows are non-trivially intertwined. Typically, an end-user would launch the interactive application and navigate through the application screens to perform some operation. An operation may, for example, be a business operation, such as "Query customer details given a customer id". Prior to applying the process of refactoring system 300, the application exhibits characteristics associated with being interactive, stateful, and monolithic. The result of using refactoring system 300 is an operation that is non-interactive, stateless, and componentized.

In the following example a set of definitions is used in which a developer refers to a person using a software tool to extract a service from an existing application as opposed to an end-user of the application. A user refers to a person who typically uses the application. A term end-user may also be used interchangeably. A field represents a user interface input or output element (input field and output field) and a variable is defined as a named identifier to a program storage area used internally by an application to temporarily store values.

Refactoring system 300, in one illustrative embodiment, divides a process of refactoring a monolithic application into phases, including phase A for identifying the operation of interest, phase B for resolving branches that are not taken also referred to as non-visited branches, and phase C for source extraction of the operation. During phase A, a developer runs the application in an execution environment that is enabled for debug. The debug functions in the environment are used to capture several pieces of execution data associated with the application path traversed by the developer, including line numbers, program and screens variables. During phase B potential ambiguity decision points (relevant branches) in the execution path are addressed, such as branches that are not chosen during phase A and that may be activated depending on screen variable values. During phase C a visited path and associated execution dependencies are extracted from the monolithic code, to make a stand-alone, execution module suitable for compilation.

Componentization is a subset of activities in which lines of code relevant for an end-to-end operation are isolated and extracted. Refactoring system 300 integrates source-level functions of a debugger with a tool to extract code from an application source, based on source trace information obtained from the debugger. To identify the source that participates in the operation, refactoring system 300 enables a developer to screen-navigate through the application along a path that defines the operation to be extracted, while the debugger collects source line numbers of executed code 320. The line numbers are then fed into the extractor tool to copy the corresponding source lines from the application and create a component that encapsulates the operation. The resulting component needs to include necessary cross-referenced variables and parameters before being packaged as a service.

In addition to the line numbers, relevant program variables are also collected. The relevant program variables may be categorized as globally-accessed variables, user input variables that are input fields on the application screen, and user output variables that are output fields on the application screen. This portion of refactoring system 300 deals only with globally accessed variables. Compilers typically generate variable cross-referencing information, such as compiler variable cross-reference 324 which can be fed into the extractor to locate a source line that defines and declares the variables referenced during execution of the operation. By including in the component all global variable declarations referenced by the isolated code using variable declaration line numbers for screen and global variables 326, and ensuring that the variables receive values from parameters to the component, all dependencies on external states are eliminated.

Variables that are displayed on the screen during user interaction expose screen variable 310 either as outputs or inputs 312, are intercepted by the debugger and flagged to be part of the interface to the operation being refactored. Input and output variables are coded as interface parameters to the component. Input variables set to constant values are not reflected in the interface. The input variables not reflected in the interface are variables that are flagged by a developer as hidden from the interface in an operation such as indicate which variables to hide 314. An operation of update variable attributes 316 also ensures a current list of variables used 322 in which individual attributes for each variable are also specified. Any user interface logic is no longer required and is therefore eliminated resulting in achieving a non-interactive component.

In phase A, developer 302 identifies the operation they want to extract from the original application by running business operation 304 of monolithic interactive application 308 and following the path of the operation the developer wants to extract. As the developer executes the application, the tool records the original source lines that are executed. Dynamically mapping the executed code path of the selected service to source lines, and recording executed source lines as the source lines are executed, identifying a visited path and execution dependencies for the selected service and identifying unresolved branches in the execution data to form unresolved branches can be accomplished using current debugger technology in debug environment 306. The business operation may be re-run for relevant branches 318 to be identified.

A code-extractor-assist tool of refactoring system 300 may be in the form of a source editor that highlights the lines that need to be extracted 328 from original source 330, or may have a view that shows only those lines, and can therefore be saved during save lines 336 to a separate file such as extracted source 338. Highlighted unresolved branches 332 are presented to developer 302. Developer 302 can iterate through highlighted unresolved branches 332 to resolve the unresolved branches 334 in phase B. The resulting code is operation-atomic and self-contained, with a well-defined interface with input and output parameters. The code can be compiled by compile 340, in phase C, as a reusable component for use on server 342 with the component interface externalized to be locally accessible as a native language environment service using a native interface 344 or Web-accessible using Web service interface 346 as a Web service.

In contrast to refactoring system 300, existing refactoring tools operate typically at a source level. The existing refactoring tools use source static analysis techniques to perform change impact analysis and identify static relationships in the code, requiring a developer to carve out an operation at the source level by using the static relationships. The existing refactoring tool approach is labor intensive and prone to errors since the approach typically does not leverage natural code flow inherent in a running application. The developer manually locates the network of source blocks corresponding to an operation to be extracted. Using impact analysis, the developer ensures that all dependent variables are also identified.

In addition other tools, such as application navigation recorders, do not strictly perform operation extractions. The application navigation recorders tools operate at a screen flow level and record user-interactions during an application run. The recorded scripts are replayed during subsequent runs to auto-navigate through the application, externalizing only a subset of the screen variables. Non-externalized screen variables are filled with values from the recorded script. In this approach using application navigation recorders, no code is extracted, the entire application runs in an original user-interactive manner, but with the user replaced by a program to interact with the application in a programmatic manner. The subset of the application that is programmatically externalized is treated as the refactored operation. The approach using application navigation recorders does not refactor operations from larger applications. Runtime resource requirements are left unchanged leading to scalability and performance issues when the refactored operation is deployed for web access. Furthermore, any user interface modifications made to the original application require an update of the recorded scripts used to create the externalized operation.

Refactoring system 300 uses a combination of dynamic and static analyses to enable programmatic mapping between an atomic business operation and a source implementation of the business operation, thereby allowing easy extraction of the business logic for that operation. Refactoring system 300 alleviates the need for a developer to have intimate knowledge of the business code and to have to manually identify the source to be refactored. Refactoring system 300 is typically error-free and efficient, requiring less development and testing effort.

Figure 4:
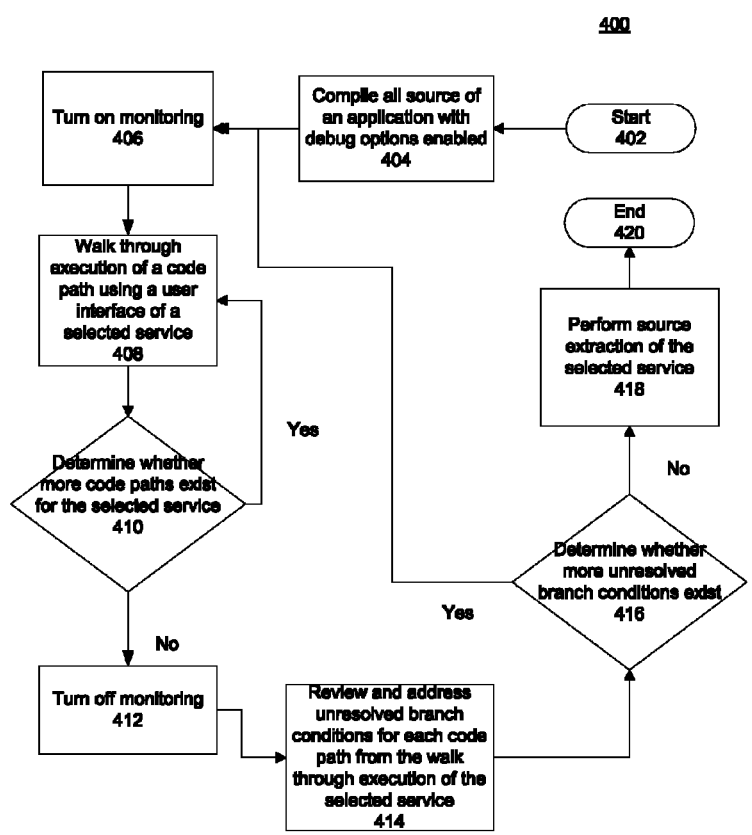
FIG. 4 is a flowchart of a high level view of an extraction operation using the refactoring system of FIG. 3, in accordance with one embodiment of the disclosure.

With reference to FIG. 4 a flowchart of a high level view of a refactoring operation using the refactoring system of FIG. 3, in accordance with one embodiment of the disclosure is presented. Process 400 is an example of an embodiment of a refactoring operation of a source application to create a source extraction.

During phase A, process 400 starts (step 402) and compiles all source files required by an application with debug information, typically all debug options enabled (step 404). A developer using process 400 invokes a compilation of the source. Process 400 turns on monitoring of the application service operation activity (step 406). A developer starts the execution monitoring specifying the processes where the application will be run. A debugger is initiated in a headless mode (no debugger user interface) and attaches the debugger to the specified process. Process 400 provides a capability to start the application of interest in the specified process and walk through execution of the code path of a selected service of the application using a user interface of the selected service or application (step 408). An application service comprises one or more code paths. Typically, when many business operations are packaged as one service, the service becomes unusable. A service accordingly is atomic and addresses one business process. As the code along the path of the application service executes, the debugger records each source line executed.

Process 400 determines whether more code paths exist for the selected service (step 410). The code walk though focuses on the code path of the selected service. When a determination is made in step 410 that more code paths exist process 400 loops back to perform step 408 again as before. The developer can re-run the operation as many times as required in order to execute alternate code paths for the selected service from the application. This is illustrated by the loop back from step 410 to step 408. The loop back comprises a set of traversals of the relevant code paths associated with the selected service being monitored.

The developer drives the business operation from the user interface of the application. The target operation may consist of zero, one, or more user interface screens that display information to an end-user and accept user inputs. A "screen" is defined as a collection of output records displaying information followed by a read of a record that returns information entered by the end-user to the application. When data is returned to the application as the result of a screen read, the debugger displays a dialog showing all output and input fields for the screen. The developer then goes through each of the output fields and identifies which will be returned from the refactored service. For each of the input fields, the developer designates the field as either an input to the service or provides a constant value that will always be used as input for that field. All screen inputs and outputs are recorded by the debugger along with a decision by the developer regarding field handling. The output of phase A is a record of all source lines that were executed by the developer, and the list of all screen input and output fields along with how each field should be handled in the extracted service (as designated by the developer).

When a "no" result is obtained in step 410, process 400 turns off monitoring of the application service (step 412). Process 400 provides a capability to review and address unresolved branch conditions (step 414). A developer is guided through the process using information obtained from the application execution and flow. Addressing unresolved branch conditions typically is performed on a case-by-case basis due to the variety of conditions needing to be resolved.

Process 400 determines whether more unresolved branch conditions exist (step 416). When a determination is made in step 416 that more unresolved branch conditions exist, process 400 loops back to perform step 406 as before. Unvisited code paths are then traversed. When a "no" result is obtained in step 416, process 400 performs a source extraction of desired services (step 418) and terminates thereafter (step 420).

Figure 5:
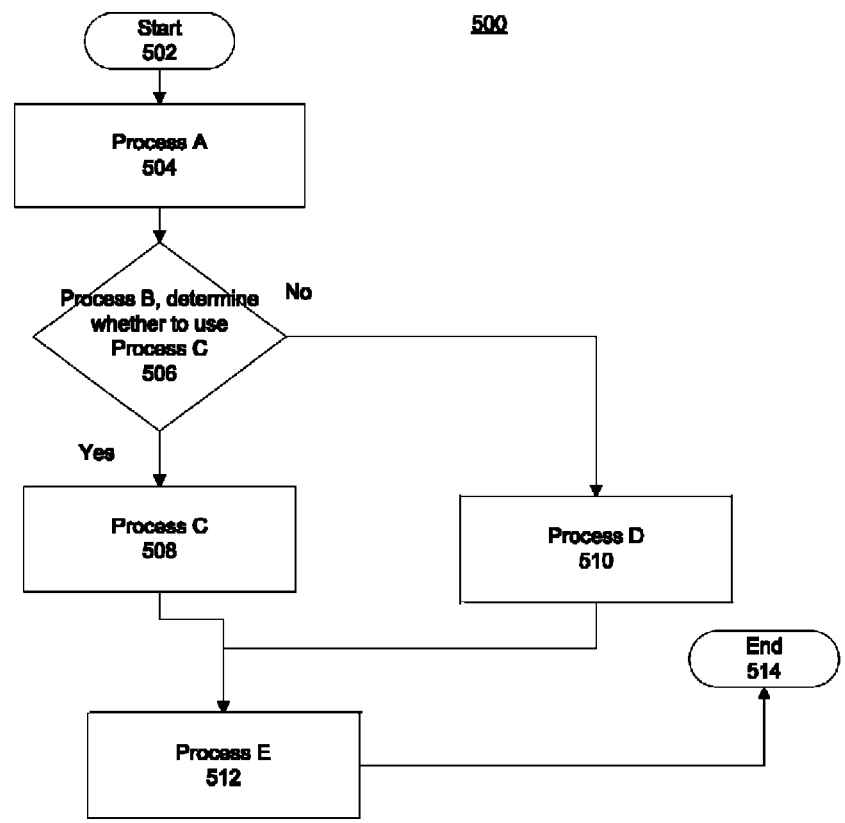
FIG. 5 is a flowchart of an example process leading to an unresolved branch, in accordance with one embodiment of the disclosure.

With reference to FIG. 5 a flowchart of a process for an ambiguous decision point using the refactoring system of FIG. 3, in accordance with one embodiment of the disclosure is presented. Process 500 is an example of the process of reviewing and resolving unresolved branches of process 400 of FIG. 4.

Process 500 is representative of step 414 of process 400 of FIG. 4 and is referred to as phase B of refactoring system 300 of FIG. 3.

During phase B, all unresolved branches are identified, and the developer is guided through a process of resolution. An unresolved branch is defined as a conditional statement from which there are two possible code paths; one path is taken if the condition evaluates to true, the other path is taken if the condition is false. Process 500 shows an example using a simple and familiar decision flow chart. Process 500 depicts two possible code paths beginning at start (step 502) followed by Process A (step 504), process B (step 506), process C (step 508), process E (step 512) and Process A (step 504), process B (step 506), process D (step 510), process E (step 512), with each path ending (step 514). When a developer exercised process B (step 506), process C (step 508), process E (step 512) during a first phase but not process B (step 506), process D (step 510), process E (step 512), then process B (step 506), process D (step 510), process E (step 512), is an unresolved branch.

The branch is defined as unresolved, because from the standpoint of extracting associated source code into a service, uncertainty remains regarding how to process and represent the code block represented by process D (step 510). The developer may want the code block extracted along with the other source code, a warning logged when process D branch (step 510) is attempted in the extracted service, or an exception thrown. The developer must resolve these "non-executed" branches on a case-by-case basis, since no single action would be correct in all cases.

Visualization of the resolved and unresolved branches is typically used to assist the developer in identifying and resolving the unresolved branches. One example of visualization opens the source code in a specialized editor to visually differentiate, using color or shading, all executed lines from all non-executed lines. The specialized editor may also highlight unresolved branches and provide a navigator for the developer to easily navigate and find the unresolved branches. The developer can resolve each of the unresolved branches, on a case-by-case basis. For example, the developer may select to include the source lines for the unexecuted branch in the extracted service. In another example, a developer may choose to repeat identifying the operation and executing the branch. The results of this execution are then merged with the current context and the visualization updated to reflect the combined results.

In another example, a developer may explicitly choose not to include the unresolved branch in the extracted code. This option would be valid when a developer never expects the unresolved branch to be executed at runtime in the extracted service. When the unresolved branch does get executed at runtime in the extracted service, then the unresolved branch would most likely be a programming error (the branch should have been included and resolved or the inputs to the service were not properly validated). When the condition causing the unresolved branch evaluates to true at runtime in the extracted code one of three options is selected. In a first option, complete removal of the branching condition is performed and execution of the resolved branch always occurs. This option would usually be chosen when the developer decides there was an error during the extraction.

In a second option, the branching condition is kept and a warning is logged when the unresolved branch is executed. This option results in a warning being logged, the resolved (and extracted) branch being skipped and execution continuing where the resolved and unresolved branches merge.

In a third option, the branching condition is kept and a program exception is thrown when the unresolved branch is executed. This option would generally result in the program being terminated.

Figure 6:
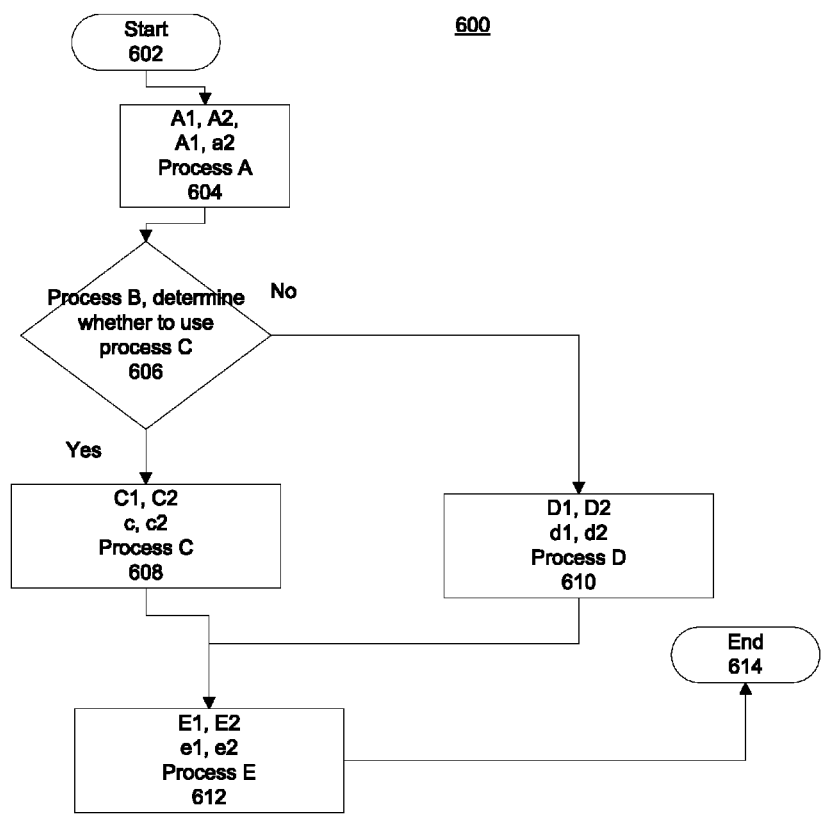
FIG. 6 is a flowchart of an example process leading to an unresolved branch with screen inputs and outputs, in accordance with one embodiment of the disclosure.

With reference to FIG. 6 a flowchart of a process for an ambiguous decision point of FIG. 5 with screen inputs and outputs, in accordance with one embodiment of the disclosure is presented. Process 600 is an example of processing ambiguous decision points of FIG. 5 when using screen inputs and screen outputs.

Each of the input parameters to a refactored service are chosen from a set of input fields on user interface screens displayed during an execution pass. Similarly, output parameters are chosen from the set of output fields on user interface screens. However, when two or more mutually exclusive paths are selected for extraction, and each path has a different set of user interface screens, determining how the input fields and output fields should map to a service interface is not as clear.

Using the example of FIG. 6, a sample flow introduced in FIG. 5, depicts process 600 in which execution results in either process C (step 608) or process D (step 610) being executed. FIG. 6 builds on the execution flow of FIG. 5 to show sample screen inputs and outputs. Capital letters are used to denote screen outputs and lowercase letters denote screen inputs. For example, process 600 starts (step 602) and depicts A1 and A2 representing screen outputs and a1 and a2 representing screen inputs that correspond to a code block of Process A (step 604). Process B includes a determination of whether to use process C (step 606). The problem that arises for inputs and outputs from code blocks of process C (step 608) or process D (step 610) is that adding the code blocks to a service interface would lead to a bloated interface including parameters not always required (for inputs) and valid (for outputs). When outputs C1 and D1 were both included as return parameters, only one parameter would be set with a value when the service was called. The caller would have to determine which parameter had a valid value. Results of the decision to use process C or process D may impact process E (step 612). Process 600 terminates (step 614).

The example uses the following notation to represent the input and output parameter set for a service: {u, (v|w), [x], y}. Each entry, separated by a comma, represents a different parameter (either input or output) to the service. In this example there are 4 parameters. The parameters of u and y represent the first and last parameters respectively. Each parameter represents a variable in the extracted service. The parameter choice of (v|w) represents the second parameter. When this choice is an input parameter then either field v or field w is assigned the incoming value for the parameter. When this is an output parameter, then the output value is obtained from either field v or field w. The parameter [x] represents the third parameter. The square brackets denote that the parameter as optional. When this is an input parameter the value of the field may or may not be used depending on the execution path taken. When this is an output parameter, then the value of the parameter may or may not be set, depending on the execution path taken.

During phase B, where outside branches are resolved, the developer may decide to include additional execution paths to be extracted. As mentioned previously, this introduces issues when the new branch either bypasses a user interface screen already included for extraction, or adds a new user interface screen. When a new user interface screen is added, the developer has the option to include any output fields on the screen as output parameters, and include any input fields on the screen as input parameters to the service. By default, this makes the parameters optional since this execution path may or may not be taken at runtime. The choice also makes any input and output parameters from screens on peer branches optional since these branches would not be used when the current execution path is taken. Simply adding optional parameters to screens from all possible execution paths would quickly lead to a bloated service interface, making the service very difficult to understand, use and be error prone.

In some cases, the information displayed on peer screens may be the same pieces of information, displayed using the same, or possible different, field names. For example, in a simple program that displays customer information the program takes as input the customer number, checks the customer status and displays different screens for bronze, silver and gold customers to handle the different details for each status level. Extracting a customer lookup service would require each of the three branches to be included (bronze, silver, and gold) and would need to handle the three corresponding peer screens. However, most of the information on the three peer screens would be the same, including a first name, last name, address, and phone number. In this example the developer would want to designate a single return parameter from the service for each shared piece of information and have the value of that parameter set from whichever peer screen is executed at runtime.

This example introduces a concept of a parameter merge, in which a single input parameter can be used as input to multiple fields or a single output parameter obtains a respective value from a single field, but the field could be any field in a defined set.

Using the example in FIG. 6, a developer first includes the execution path that covers process A (step 604), process C (step 608), process E (step 612), and includes A1, C1, and E1 as output parameters using a1, c1, c2, and e1 as input parameters. The current parameter set is defined as Inputs: {a1, c1, c2, e1} Outputs: {A1, C1, E1}.

While resolving outside branches, the developer includes a branch for process D (step 610). When displayed with the fields from screens in the branch for process D (step 604), of (D1, D2, d1, d2), the developer decides that fields D1 and C1 refer to the same piece of information, as do d1 and d2. The developer also decides that D2 should be returned from the service when this execution path is taken and that input for d2 is required (and is different from c2). Via a software user interface, the developer enters this information into the software tool. The entries modifies the parameter set to now become Inputs: {a1, (c1|d1), [c2], [d2], e1} Outputs: {A1, (C1|D1), [D2], E1}.

Resolving one outside branch could lead to more unresolved branches being added when the resolved branch contains nested control structures. The solution outline above for resolving a single branch can be recursively applied to nested branches until all outside branches are resolved by one of the options outlined in the discussion of FIG. 5. There is no possibility of infinite recursion because, at the extreme case, all branches of the program would be included and there would be no unresolved branches left.

Figure 7:
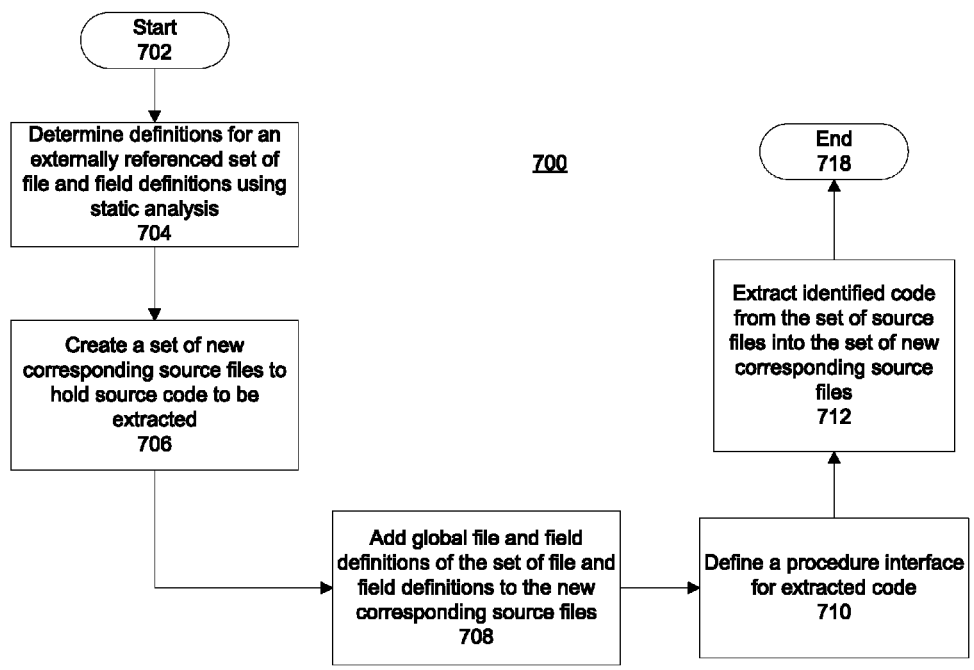
FIG. 7 is a flowchart of a process for code extraction used in the process of FIG. 4, in accordance with one embodiment of the disclosure.

With reference to FIG. 7 a flowchart of a process for code extraction used in the process of FIG. 4, in accordance with one embodiment of the disclosure is presented. Process 700 is an example of a code extraction process of step 418 of FIG. 4. Source extraction represents a phase C portion of the operation of refactoring system 300 of FIG. 3. Process 700 extracts source code associated with visited paths and execution dependencies to form extracted code.

The extraction of the source code is a process not requiring any further interaction between the developer and the application. Process 700 starts (step 702) and determines definitions for an externally referenced set of required file and field definitions using static analysis (step 704). The inputs to the source extraction were previously identified during phase A and phase B in the form of a set of source files comprising the source of the application, a set of source line numbers to be extracted, a constant value for each screen input field, or designation of the field as an input parameter, and the designation of each of the screen output field to be included as an input parameter, otherwise the screen output field is ignored.

The outputs are a new set of source files that have a one to one correspondence with the original source files (the original source files are therefore not overwritten). The new source files have the extracted source code along with a procedure interface to the extracted service, and the minimal set of file and field definitions required for the extracted code to compile and run.

Process 700 determines the set of required file and field definitions from the input to the source extraction, which is a set of executable lines of code. Using static analysis, the lines of code are analyzed to build a set of files and fields that are referenced by these executable lines and corresponding source line number(s) for the definition of each referenced file and field.

Process 700 creates a set of new corresponding source files to hold source code to be extracted (step 706). The set of new source files comprise one or more files. The execution paths selected for extraction may touch multiple source files from the original application. This may be the result of copybook (includes), external procedure calls, and dynamic program calls. The source extraction algorithm creates a corresponding output source file for each of the original source files that are touched. Source code is always extracted from the original source file to its corresponding source file output. Some source files may not include executable source lines, but may include only file and field definitions, as in the case of copybooks.

Process 700 adds global file and field definitions of the set of required file and field definitions to the set of new corresponding source files (step 708). Obtaining cross-reference information from a component including a compiler, compiler/linker or a linker identifies variables that are global in scope. Before extracting the executable source lines, all global file and field definitions (as identified in step 704) are extracted to the new corresponding source files.

Process 700 defines a procedure interface for extracted code (step 710). The main entry point for the original program is recreated in a new corresponding source file as a procedure. The procedure interface is created for all original program input and output parameters that are required by the extracted source code and the input and output parameters identified from the original screen inputs and outputs.

Process 700 extracts identified code from the set of source files into the set of new corresponding source files (step 712) with process 700 terminating thereafter (step 714). All of the source code lines identified for extraction are copied from respective original source files to the new corresponding source files. The copied source code includes all nested subroutine and procedure structures that contain extracted code as well as externally called programs. For example, when an execution path includes a call to an internal procedure, the extracted code includes that procedure and all executed lines inside that procedure (but not the unexecuted lines).

As part of the extraction operation of process 700, all of the original user interface screen definitions and access (reads and writes) are removed. The screen definitions are no longer required and are not replaced with anything. Parameters to a service corresponding to original screen input and output are given unique names to differentiate from the field name used in the program and screen input and output. The parameter lists for all nested procedure and program calls are updated to pass in any parameters that correspond to fields used in screen input and output in the nested procedure and program calls.

Screen writes (outputs) are replaced with assignment statements assigning the value of the output field to its corresponding output parameter. Screen reads (inputs) are replaced with assignment statements assigning the value from its corresponding input parameter or the developer specified constant value. During the execution capture, a single program field may be capturing user input from different screens during the execution, with each input potentially being unique. Capturing user input from different screens during the execution, with each input potentially being unique is handled in the extraction process by defining different input parameters for each of the unique screens where the field is used for input. Similarly, a single program field may provide output to different screens in the original program. This is also handled by defining different output parameters in the generated service for each of the unique screens where the field is used as output.

The method disclosed uses a combination of dynamic and static analysis to programmatically map between an atomic business operation and a complete source implementation of the business operation, allowing easy extraction of the business logic for that operation. Since the mapping process uses dynamic analysis, the disclosed process alleviates the need for the developer to have intimate knowledge of the code base to isolate end-to-end operations from larger interactive code bases. Usage of static analysis during the extraction process to resolve any references to external element definitions enables the resulting smaller business-level functional components to be fully capable of compilation. The result is an extracted set of self-contained business components that are re-usable as services. The approach is typically error-free and efficient, requiring much less development and testing effort for migrating interactive legacy applications to a service-oriented environment than previous solutions.

Thus is provided in one illustrative embodiment, a computer-implemented process for refactoring an interactive application to extract a service from the interactive application. The computer-implemented process compiles source of a selected service of the interactive application with debug options enabled, enables monitoring of execution activity of the selected service and executes a code path of the selected service of the interactive application in a debug environment using a user interface of the selected service to identify execution data associated with the selected service. The computer-implemented process further addresses unresolved branch conditions in the execution data and performs a source extraction of the selected service.

Embodiments of the disclosed process could be offered as a business service on a subscription or fee basis. For example, a computer system such as network data processing system 100 of FIG. 1 or data processing system 200 of FIG. 2 could be created as embodiments of refactoring system 300 of FIG. 3 and deployed by a service provider to offer the functions described herein to customers.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer program product comprising a non-transitory computer readable storage medium having computer usable program code embodied therewith, the computer usable program code comprising:
   computer usable program code stored in the non-transitory computer readable storage medium configured to enable monitoring of execution activity of an interactive application;
   computer usable program code stored in the non-transitory computer readable storage medium configured to execute a code path of a selected service of the interactive application in a debug environment using a user interface of the selected service to identify execution data associated with the selected service;
   computer usable program code stored in the non-transitory computer readable storage medium configured to address unresolved branch conditions in the execution data for each code path of the selected service; and
   computer usable program code stored in the non-transitory computer readable storage medium configured to perform a source extraction of the selected service.

2. The computer program product of claim 1, further comprising:
   computer usable program code stored in the non-transitory computer readable storage medium configured to compile source of an interactive application with debug options enabled.

3. The computer program product of claim 2, wherein compiling source of the interactive application with debug options enabled further comprises:
   computer usable program code stored in the non-transitory computer readable storage medium configured to receive a source application to form a target application; and
   computer usable program code stored in the non-transitory computer readable storage medium configured to specify a code path of a selected service in the target application to form an identified code path.

4. The computer program product of claim 1, wherein executing a code path of the selected service of the interactive application in a debug environment using a user interface of the selected service to identify execution data associated with the selected service further comprises:
   computer usable program code stored in the non-transitory computer readable storage medium configured to dynamically map the executed code path of the selected service to source lines, and recording executed source lines as the source lines are executed;
   computer usable program code stored in the non-transitory computer readable storage medium configured to identify a visited path and execution dependencies for the selected service; and
   computer usable program code stored in the non-transitory computer readable storage medium configured to identify unresolved branches in the execution data to form unresolved branches.

5. The computer program product of claim 1, wherein addressing unresolved branch conditions in the execution data for each code path of the selected service further comprises: computer usable program code configured to prompt a developer for a selection.

6. The computer program product of claim 1, wherein performing a source extraction of the selected service further comprises:
computer usable program code stored in the non-transitory computer readable storage medium configured to create a standalone execution module for compilation using extracted code of the source extraction.

7. The computer program product of claim 1, wherein performing a source extraction of the selected service further comprises: computer usable program code stored in the non-transitory computer readable storage medium configured to extract source code associated with a visited path and execution dependencies to form extracted code.

8. The computer program product of claim 1, wherein performing a source extraction of the selected service further comprises:
computer usable program code stored in the non-transitory computer readable storage medium configured to determine definitions for an externally referenced set of file and field definitions using static analysis;
computer usable program code stored in the non-transitory computer readable storage medium configured to create a set of new corresponding source files to hold source code to be extracted;
computer usable program code stored in the non-transitory computer readable storage medium configured to add global file and field definitions of the set of file and field definitions to the new corresponding source files, wherein variables that are global in scope are identified by obtaining cross-reference information from a compiler; computer usable program code configured to define a procedure interface used for extracted code; and
computer usable program code stored in the non-transitory computer readable storage medium configured to extract identified code from the set of source files into the set of new corresponding source files.

9. An apparatus comprising:
a communications fabric;
a memory connected to the communications fabric, wherein the memory contains computer executable program code;
a communications unit connected to the communications fabric; an input/output unit connected to the communications fabric; and
a processor unit connected to the communications fabric, wherein the processor unit executes the computer executable program code to direct the apparatus to:
compile source of the interactive application with debug options enabled;
enable monitoring of execution activity of the interactive application;
execute a code path of a selected service of the interactive application in a debug environment using a user interface of the selected service to identify execution data associated with the selected service;
address unresolved branch conditions in the execution data for each code path of the selected service; and
perform a source extraction of the selected service.

10. A computer program product comprising a non-transitory computer readable storage medium having computer usable program code embodied therewith, the computer usable program code comprising:
computer usable program code stored in the non-transitory computer readable storage medium configured to execute a code path of a selected service of an interactive application in a debug mode of a debug environment using a user interface of the selected service to identify execution data associated with the selected service;
computer usable program code stored in the non-transitory computer readable storage medium configured to dynamically map the executed code path of the selected service to source lines;
computer usable program code stored in the non-transitory computer readable storage medium configured to record executed source lines as the source lines are executed;
computer usable program code stored in the non-transitory computer readable storage medium configured to detect a visited path and execution dependencies for the selected service; and
computer usable program code stored in the non-transitory computer readable storage medium configured to detect unresolved branches in the execution data to form unresolved branches.

11. The computer program product of claim 10, further comprising:
computer usable program code stored in the non-transitory computer readable storage medium configured to compile source of an interactive application with debug options enabled.

12. The computer program product of claim 10, wherein compiling source of the interactive application with debug options enabled further comprises:
computer usable program code stored in the non-transitory computer readable storage medium configured to receive a source application to form a target application; and
computer usable program code stored in the non-transitory computer readable storage medium configured to specify a code path of a selected service in the target application to form an identified code path.

13. The computer program product of claim 10, wherein addressing unresolved branch conditions in the execution data for each code path of the selected service further comprises: computer usable program code stored in the non-transitory computer readable storage medium configured to prompt a developer for a selection.

14. The computer program product of claim 10, further comprising:
computer usable program code stored in the non-transitory computer readable storage medium configured to perform a source extraction of the selected service; and
computer usable program code stored in the non-transitory computer readable storage medium configured to create a standalone execution module for compilation using extracted code of the source extraction.

15. The computer program product of claim 14, wherein performing a source extraction of the selected service further comprises: computer usable program code stored in the non-transitory computer readable storage medium configured to extract source code associated with a visited path and execution dependencies to form extracted code.

16. The computer program product of claim 15, wherein the extracted code constitutes a code path for an end-to-end operation imbedded in the interactive application.

17. The computer program product of claim 14, further comprising:
computer usable program code stored in the non-transitory computer readable storage medium configured to highlight the lines of code extracted from the interactive application.

18. The computer program product of claim 14 wherein performing a source extraction of the selected service further comprises:

computer usable program code stored in the non-transitory computer readable storage medium configured to determine definitions for an externally referenced set of file and field definitions using static analysis;

computer usable program code stored in the non-transitory computer readable storage medium configured to create a set of new corresponding source files to hold source code to be extracted;

computer usable program code stored in the non-transitory computer readable storage medium configured to add global file and field definitions of the set of file and field definitions to the new corresponding source files, wherein variables that are global in scope are identified by obtaining cross-reference information from a compiler; computer usable program code configured to define a procedure interface used for extracted code; and computer usable program code stored in the non-transitory computer readable storage medium configured to extract identified code from the set of source files into the set of new corresponding source files.

19. The computer program product of claim 10, further comprising:

computer usable program code stored in the non-transitory computer readable storage medium configured to indicate the unresolved branches of the execution data in a graphical user interface, wherein each of the unresolved branches are indicated using a unique color.

20. The computer program product of claim 10, further comprising:

computer usable program code stored in the non-transitory computer readable storage medium configured to define a procedure interface for extracted code, wherein the procedure interface is defined for all input and output parameters of the extracted source code.

\* \* \* \* \*